United States Patent
Hoeper et al.

(10) Patent No.: US 6,935,818 B2
(45) Date of Patent: Aug. 30, 2005

(54) MUNITIONS TRAILER

(75) Inventors: John H. Hoeper, Alexandria, MN (US); John V. Silver, Sauk Center, MN (US)

(73) Assignee: Wasp, Inc., Glenwood, MN (US)

( * ) Notice: Subject to any disclaimer, the term of this patent is extended or adjusted under 35 U.S.C. 154(b) by 0 days.

(21) Appl. No.: 10/686,836

(22) Filed: Oct. 15, 2003

(65) Prior Publication Data

US 2004/0081526 A1 Apr. 29, 2004

Related U.S. Application Data

(60) Provisional application No. 60/419,801, filed on Oct. 16, 2002.

(51) Int. Cl.$^7$ .................................................. B60P 7/06
(52) U.S. Cl. ............................. 410/18; 410/42; 410/49; 410/78
(58) Field of Search ............................. 410/18, 31, 32, 410/42, 46, 47, 49, 54, 56, 66, 77, 78

(56) References Cited

U.S. PATENT DOCUMENTS

| | | | | |
|---|---|---|---|---|
| 3,197,236 A | * | 7/1965 | Burton | 410/49 |
| 3,628,466 A | * | 12/1971 | Lyons et al. | 410/156 |
| 3,715,993 A | * | 2/1973 | Orlik | 410/48 |
| 4,787,788 A | * | 11/1988 | Versteeg | 410/49 |
| 6,190,100 B1 | * | 2/2001 | Mawji | 410/49 |
| 2003/0072632 A1 | * | 4/2003 | Coslovi et al. | 410/49 |

FOREIGN PATENT DOCUMENTS

| | | | | |
|---|---|---|---|---|
| EP | 59681 | * | 9/1982 | 410/49 |
| GB | 2052416 | * | 1/1981 | 410/49 |
| JP | 361291238 A | * | 12/1986 | 410/49 |
| JP | 361291239 A | * | 12/1986 | 410/49 |

OTHER PUBLICATIONS

"T.O. Description of trailer with U.S. Air Force designation MHU–140"; United States Air Force, date unknown.
Four photographs (labeled B1, B2, B3 & B4, respectively) of the MHU–140 trailer of citation No. A; original publication date unknown.
"T.O. Description of trailer with U.S. Air Force designation MHU–110"; United States Air Force, date unknown.

* cited by examiner

Primary Examiner—H. Gutman
(74) Attorney, Agent, or Firm—Gray Plant Mooty Mooty and Bennett, P.A.; Robert W. Gutenkauf

(57) ABSTRACT

A munitions trailer for transporting long bodied munitions items such as bombs and missiles from a storage location to a flight line for loading on a combat aircraft. The trailer has forward, middle and aft decks. The forward and middle decks are separated by a forward deck opening. The middle and aft decks are separated by an aft deck opening. The middle deck can be divided into forward and aft middle deck sections separated by a middle deck opening. The deck openings are covered by sets of doors. In the closed position the doors cover the deck openings whereby a flat main deck in available for general transport purposes. The main deck is convertible to one of a choice of open deck configurations by opening one or more of the door sets. When a door set is opened, the deck opening that is uncovered provides clearance for loading and unloading of long bodied munitions items from the deck. Mounting structures are attached to the doors for attachment of other structure which secures the long bodied munitions items to the deck during transport.

22 Claims, 12 Drawing Sheets

MUNITIONS TRAILER

CROSS REFERENCE TO RELATED APPLICATION

This application claims the benefit of U.S. Provisional Patent Application Ser. No. 60/419,801 filed Oct. 16, 2002.

FIELD OF THE INVENTION

The invention relates to a transport trailer to transport loads from a storage area to an aircraft for loading on the aircraft. More particularly, the invention relates to a munitions trailer for transporting munitions preparatory to loading them on a combat aircraft.

BACKGROUND OF THE INVENTION

Specialized trailers are used to transport munitions and other stores from a storage area to the flight line preparatory to loading them on an aircraft. Munitions such as ammunition, bombs and missiles must be handled with extreme care. The munitions trailer is preferably adaptable to carry a wide variety of such munitions using, as may be necessary, various tie-down mechanisms and cradle structures such as chocks and racks or any combination thereof.

An example of a particular prior art trailer that finds widespread use is one that has a U.S. Air Force designation as the MHU-141 trailer. This trailer has a flat deck convertible between open and closed configurations. The deck is divided into fore and aft decks separated by a pair of doors that extend across the full width of the deck. In the closed, flatbed deck configuration the door panels lie flat, coextensive or flush with the deck surface. In this configuration the trailer is used for more general munitions hauling purposes with the use of various tie-down structures provided.

In the open deck configuration the MHU-141 trailer is configured to haul long bodied munitions such as bombs and missiles. In this configuration the doors are opened 180° so to lie over the adjacent deck area. A deck opening is uncovered between the deck sections. The door panels have mounting rails on the door sides that face up when the doors are opened. Munitions chocks or racks are fastened to the rails when the doors are open for the purpose of holding munitions on the trailer. The chocks and/or racks are located on either side of the deck opening. A loader is used to load and unload bombs and missiles from the trailer. The loader has lifting arms or a platform that lifts the munitions item near its center of gravity sets the munitions item on the trailer so that one end of the munitions item rests on a chock or rack support on the fore deck and the other end on a similar chock or rack support on the aft deck. In loading and unloading the loader lifting structure traverses the deck opening.

Such prior art munitions trailers function satisfactorily for the most part, but the ability of aircraft to carry larger and more varied payloads has created a demand for trailers with a larger capacity. At the same time, the size of the munitions trailer is a factor in terms of maneuverability and transportability.

SUMMARY OF THE INVENTION

The invention pertains to a munitions trailer of the type characterized by an expansive flat main deck convertible between closed and open configurations. In the closed, flat bed configuration the deck is usable for the transport of general munitions loads or other stores and for that purpose is equipped with various tie down structures. In the open configuration the deck can be equipped with multiple support or cradle structures for the transport of a quantity of long bodied munitions. The deck can be configured to one of a selection of open deck configurations depending upon the mission.

The main deck is longitudinally divided into forward, middle and aft decks that are separated by deck openings and are connected by segments of a main beam structure. The deck has forward, middle and aft door sets for closing the deck openings between the forward, middle and aft decks. Each door set has two opposed doors. In the closed deck configuration the doors lie flat or flush with the deck. The doors extend laterally across the deck width. Each door has pair of mounting rails on the side of the door that faces down when the door is closed. When the door is opened the rails are exposed and available for mounting munitions support structure. Opening the opposing doors of a set uncovers the deck opening between the deck sections. The deck opening provides clearance for the use of loading and unloading equipment to load and unload long bodied munitions from the deck.

The provision of forward, middle and aft door sets adds versatility and capacity to the trailer not known in the prior art. The main deck can be configured to a selected one of several available choices of open deck configurations according to the load and capacity needed. For example, use of the fore and aft door sets in an open deck configuration permits loading of two ranks of long bodied munitions. Use of either the fore or aft door set alone leaves the remainder of the deck flat and available for transport of other miscellaneous munitions items. Use of just the middle door set in an open deck configuration permits loading of a single rank of large long bodied munitions.

IN THE DRAWINGS

FIG. 9A is a perspective view of a portion of the munitions trailer of FIG. 9 generally viewed from the view line A—A thereof;

DESCRIPTION OF A PREFERRED EMBODIMENT

Figure 1:
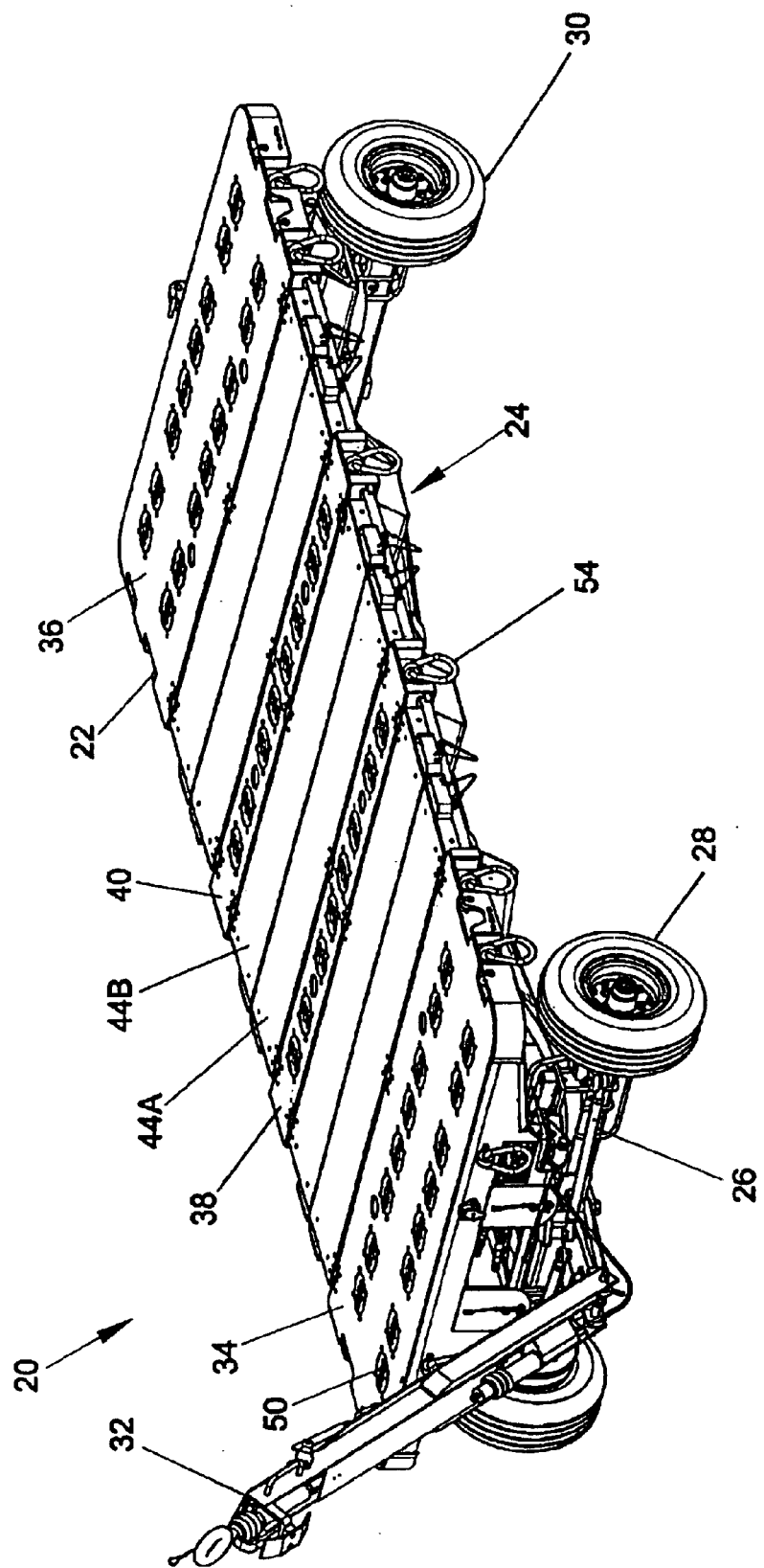
FIG. 1 is a view in perspective of an embodiment of a munitions trailer according to the present invention in a closed deck configuration.
Figure 2:
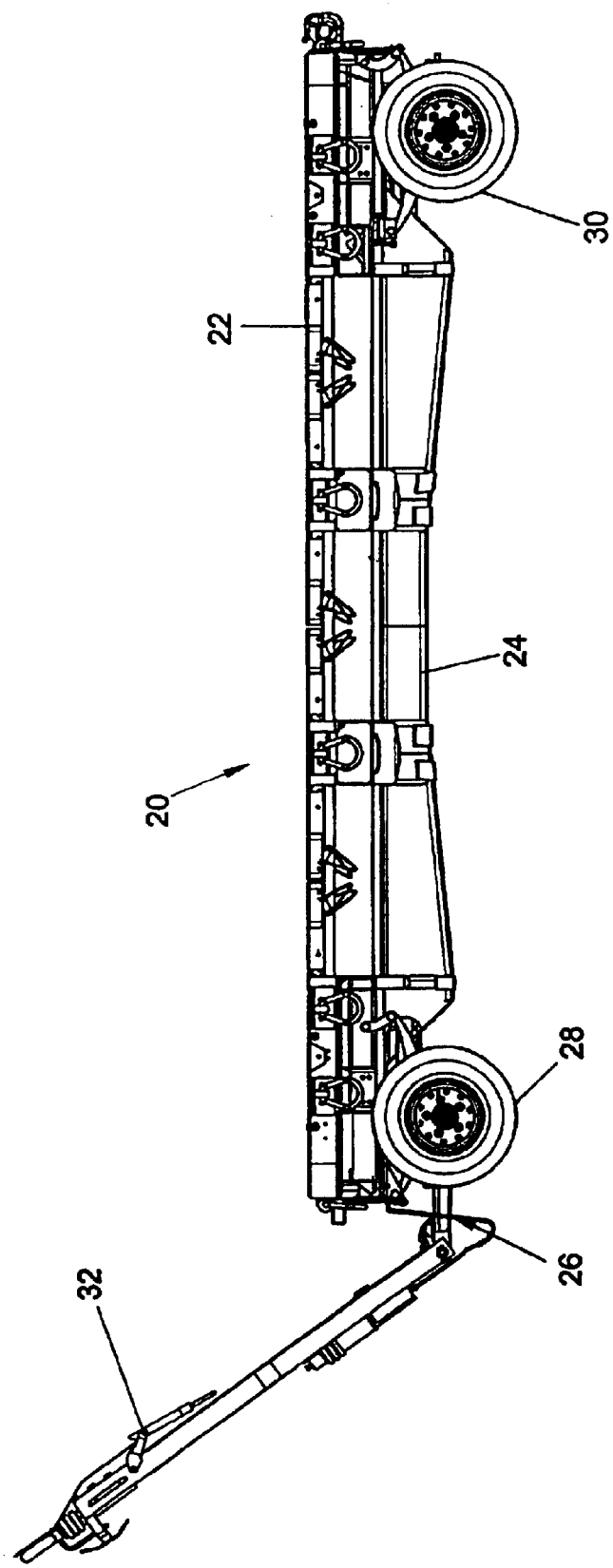
FIG. 2 is a side elevational view of the munitions trailer of FIG. 1.
Figure 3:
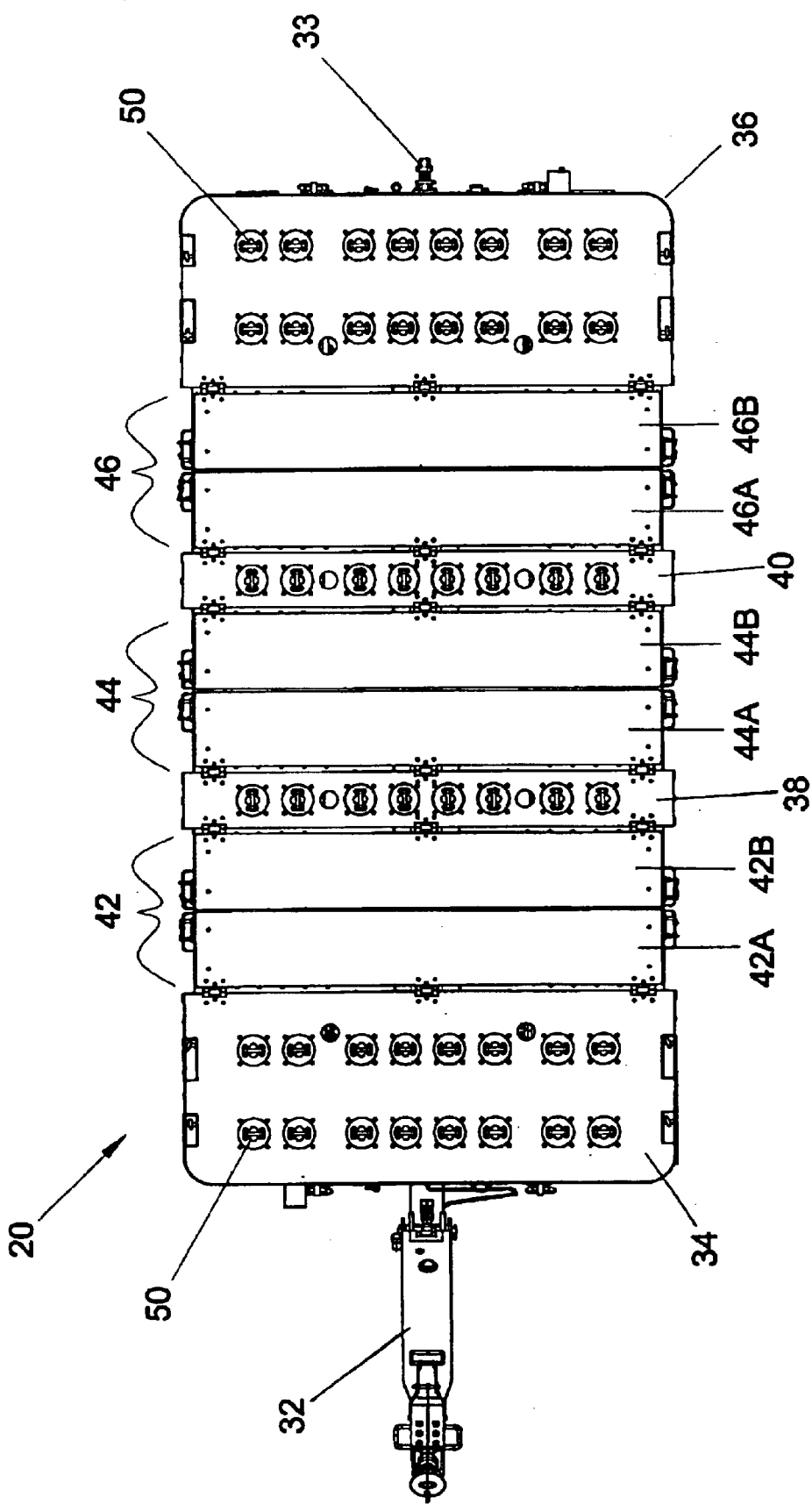
FIG. 3 is a top plan view of the munitions trailer of FIG. 1.

Referring to the drawings, there is shown in FIGS. 1 through 3 a munitions trailer indicated generally at 20. Munitions trailer 20 has a main deck 22 which is shown in FIGS. 1 through 3 in the closed or flatbed deck configuration with a flat, unobstructed top expanse. Deck 22 is carried by a frame 24 mounted on a running assembly 26. Running assembly 26 includes a set of front wheels 28, a set of rear wheels 30 and a tow bar 32 for towing by a tow vehicle. A rear coupler 33 connected to the deck permits multiple trailers to be towed in tandem.

Munitions trailer 20 is derived from the previously described prior art trailer having a single set of doors centrally located in the trailer deck separating the deck into fore and aft decks. Munitions trailer 20 of the present invention has a multiple of sets of such doors permitting, in addition to the closed deck configuration, a selection of multiple open deck configurations according to the capacity requirements dictated by the particular mission of the trailer.

Figure 11:
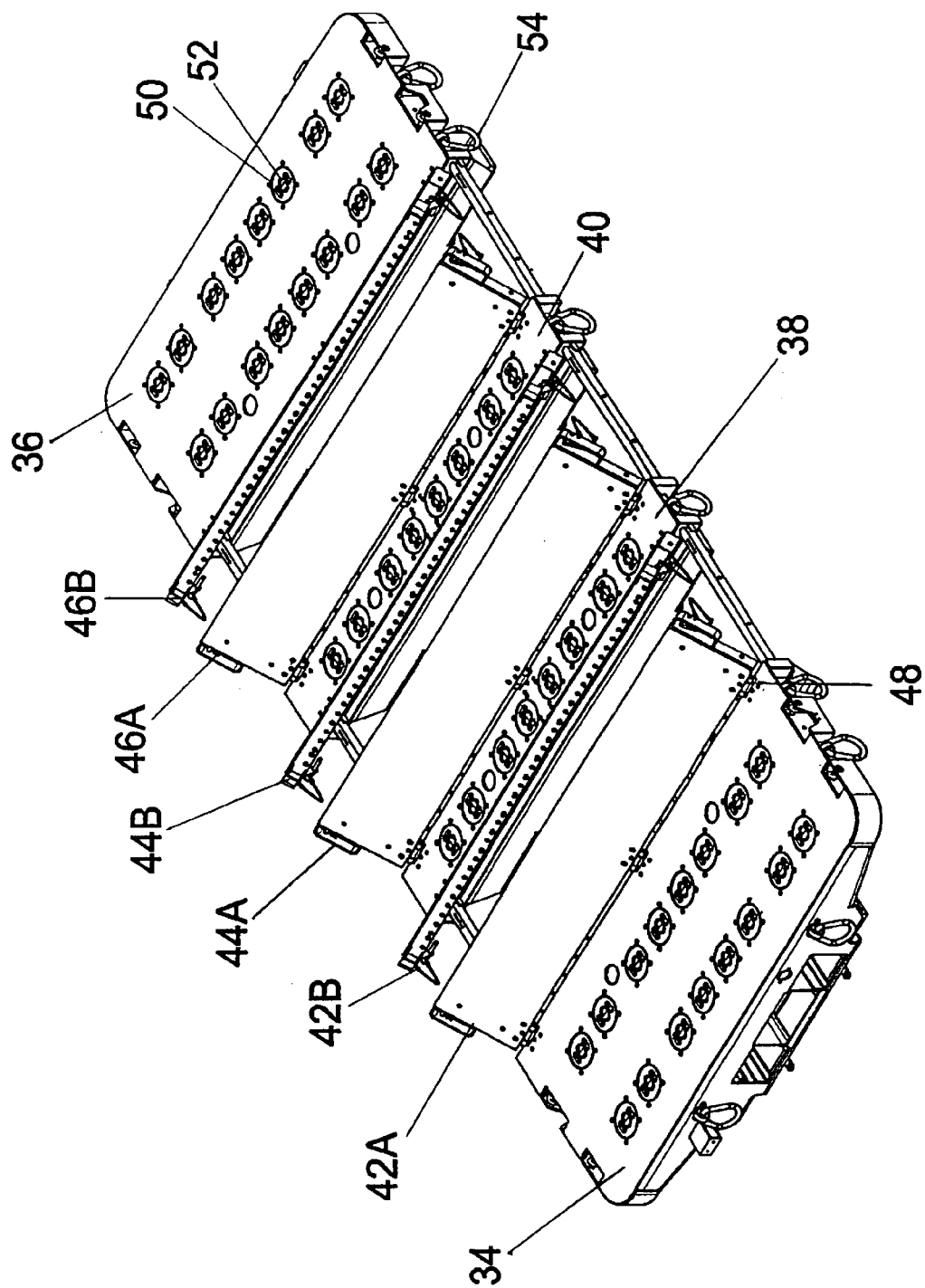
FIG. 11 is an enlarged view of just the munitions trailer deck that is shown in FIG. 9.

As shown in FIGS. 3 and 11, deck 22 includes a forward deck 34, a middle deck comprised of forward and rear middle deck sections 38, 40, and an aft deck 36. The various deck sections are separated by deck openings. The deck openings are spanned by door assemblies, including a forward door set 42, a middle door set 44 and an aft door set 46. Each door set includes a pair of first and second doors. The doors extend laterally across the width of the deck. The forward door set 42 includes a first door 42A connected to the trailing edge of the forward deck 34. A second door 42B is connected to the leading edge of the forward middle-deck section 38. The middle door set includes a first door 44A connected to the trailing edge of the forward middle-deck section 38. A second door 44B is connected to the leading edge of the rear middle-deck section 40. In like manner, a first door 46A of the aft door set 46 is connected to the trailing edge of the rear middle-deck section 40. The second door 46B of the aft door set is connected to the leading edge of the aft deck 36.

Each door set is connected to the respective deck section by a hinge set as indicated at 48 in FIG. 11 permitting rotational movement of the doors between open and closed positions. Each door has a first side or top side that faces up and lies flush with the deck in the closed deck configuration, and a second side or down side that faces down in the closed deck configuration.

Various tie down mechanisms 50 are located about the top and sides of deck 22. Mechanisms 50 can include recessed tie down rings 52 (FIG. 11), conventional tie down rings 54 and other tie down structures.

Figure 10:
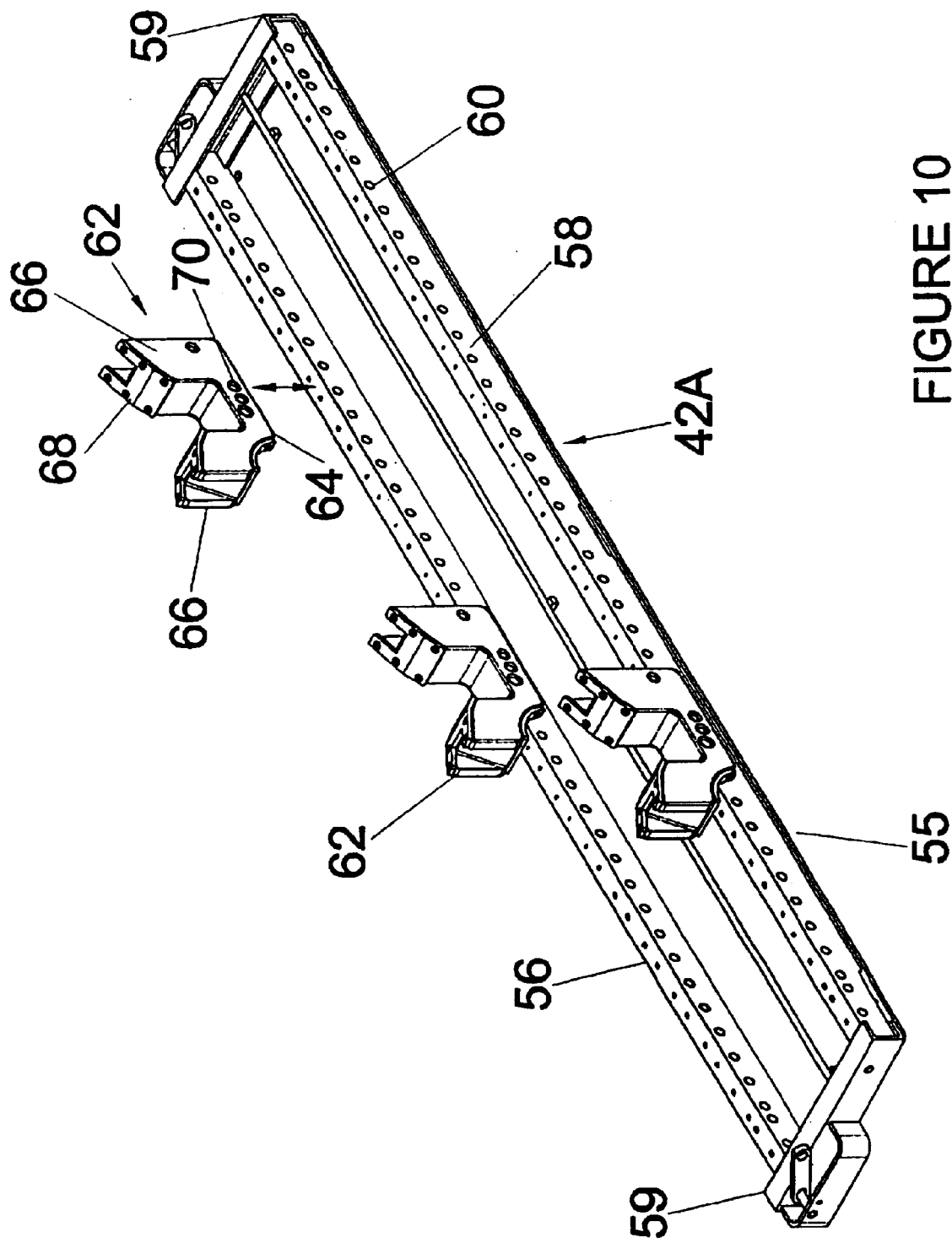
FIG. 10 is a perspective view of one of the door panels of the munitions trailer showing the mounting rails attached to it.

The down side of each of the doors is equipped with a set of mounting rails. FIG. 10 illustrates a typical door 42A. Door 42A includes a flat door panel 55 and a set of parallel mounting rails. A rail set includes first and second parallel, spaced apart rails 56, 58. An end brace 59 is disposed at each end of the panel 55. The rails extend substantially the entire length of the door panel 55 and in a direction to extend across the width of the deck 22. Each rail is a box-shaped member fastened to the door panel by suitable means. Each rail has a plurality of mounting openings 60 for the mounting of various types of munitions supporting structures.

FIG. 10 shows several removable chocks 62. Each chock 62 has a channel-shaped base 64 so as to fit in straddling relationship over a mounting rail such as shown on the rail 56 in FIG. 10. Each chock has parallel, spaced apart legs 66 extending from base 64 that end in confronting cradle surfaces 68 for positioning of a segment of a cylindrical long bodied munitions item. Base 64 has mounting openings 70 corresponding to the mounting openings 60 on the rails. Pins or bolts passing through corresponding mounting openings are used to secure the base 64 to the rail.

Figure 9:
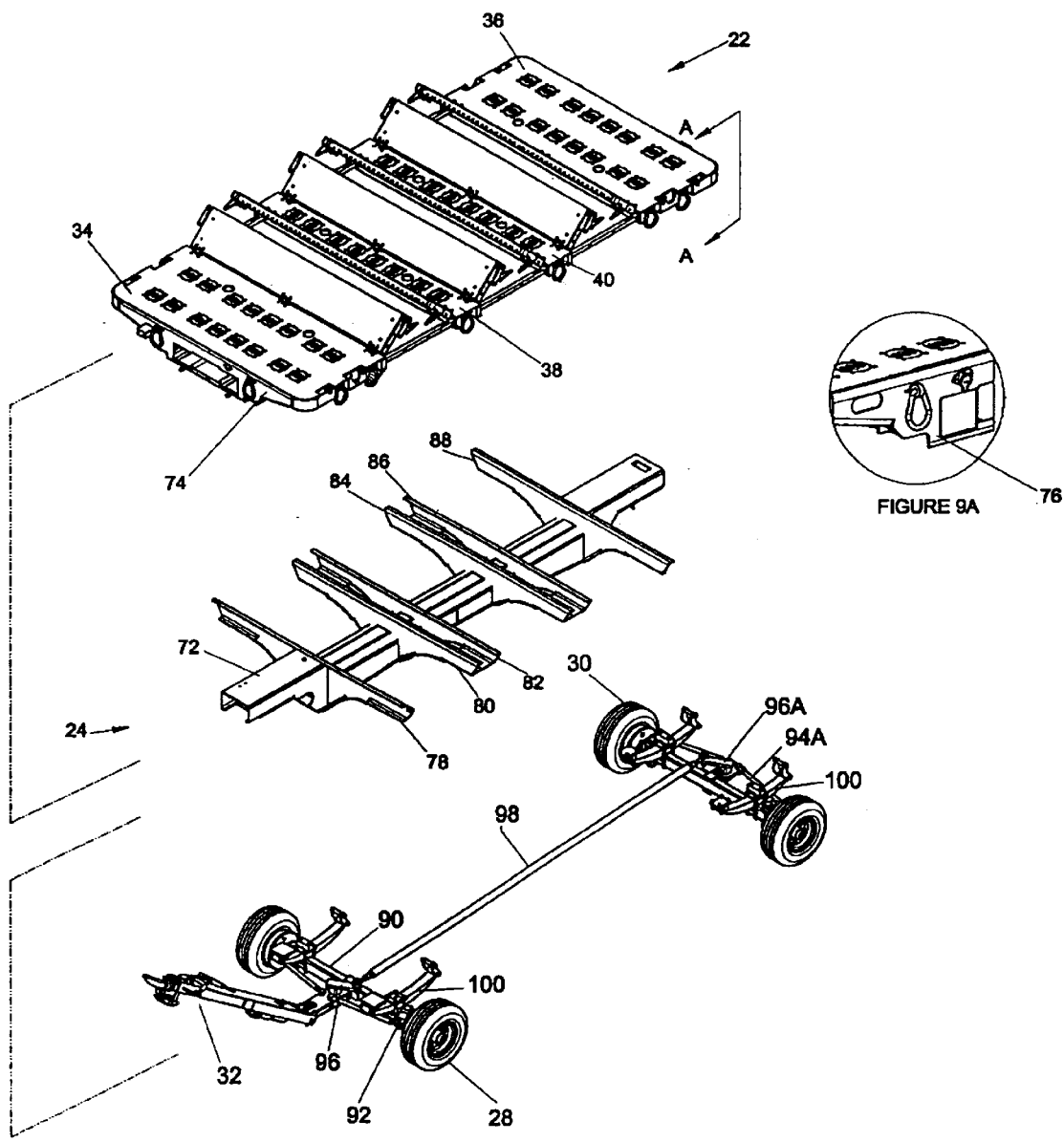
FIG. 9 is an exploded view of a munitions trailer of the present invention showing the deck, the frame and the running gear assembly.

FIG. 9 shows the deck and the undercarriage of the trailer 20 in exploded view. The frame 24 includes an elongate spine structure including a central main beam structure 72 connected to a plurality of lateral bulkheads that support the deck. A forward bulkhead 74 is attached to the leading edge of deck 22. A rear bulkhead is attached at the opposite end. Intermediate first through sixth bulkheads 78, 80, 82, 84, 86 and 88 are attached intermediately along segments of main beam 72. The bulkheads are spaced apart and positioned in order to support the various deck sections. The various bulkheads have a lateral dimension corresponding to the deck width. The front bulkhead 74 and the first intermediate bulkhead 78 support the forward deck 34. The second and third intermediate bulkheads 80, 82 support the forward middle-dock section 38. The fourth and fifth intermediate bulkheads 84, 86 support the rear middle-deck section 40. The sixth intermediate bulkhead 88 and the rear bulkhead 76 support the aft deck section 36. The deck sections are connected to the bulkheads by suitable means such as welding.

Running gear 26 includes an axle 90 that connects the front wheels 28. A rear axle connects the rear wheels 30. The front and rear wheels are steerable according to well-known Ackerman geometry principles. Steering aims 92 extend from knuckles connecting the wheels to the axle 90. Tie rods 94 extend from the steering arms to the trailer tongue 32. Turning of the trailer tongue 32 causes a turning of the front wheels 28 in such a manner that upon execution of the turn, the wheels turn about a common center of rotation. A crank arm 96 is attached to the rear end of the tongue 32 and is also attached to a connecting rod 98. The other end of connecting rod 98 connects to a rear crank arm 96A. The rear axle carries rear wheels 30 through conventional knuckle assemblies. Steering arms extend rearwardly from the knuckle assemblies and connect to tie rods 94A that are connected to the central mounting plate carrying the rear crank arm 96A. Through the connecting rod 98, the rear wheels 30 turn about coincidental centers of rotation in complimentary correspondence to the front wheels.

Leaf spring assemblies 100 connect the forward and rearward axles to the frame 24 as by being connected to lower lips associated with the bulkheads.

The munitions trailer 20 is usable in the closed deck configuration and is convertible to a choice of multiple open of deck configurations. In the closed deck configuration of FIGS. 1 through 3, the unobstructed flat deck surface is usable for attachment and transport of various munitions and other service devices using the various tie-down mechanisms provided.

FIGS. 4 through 8 illustrate optional open deck configurations.

Figure 4:
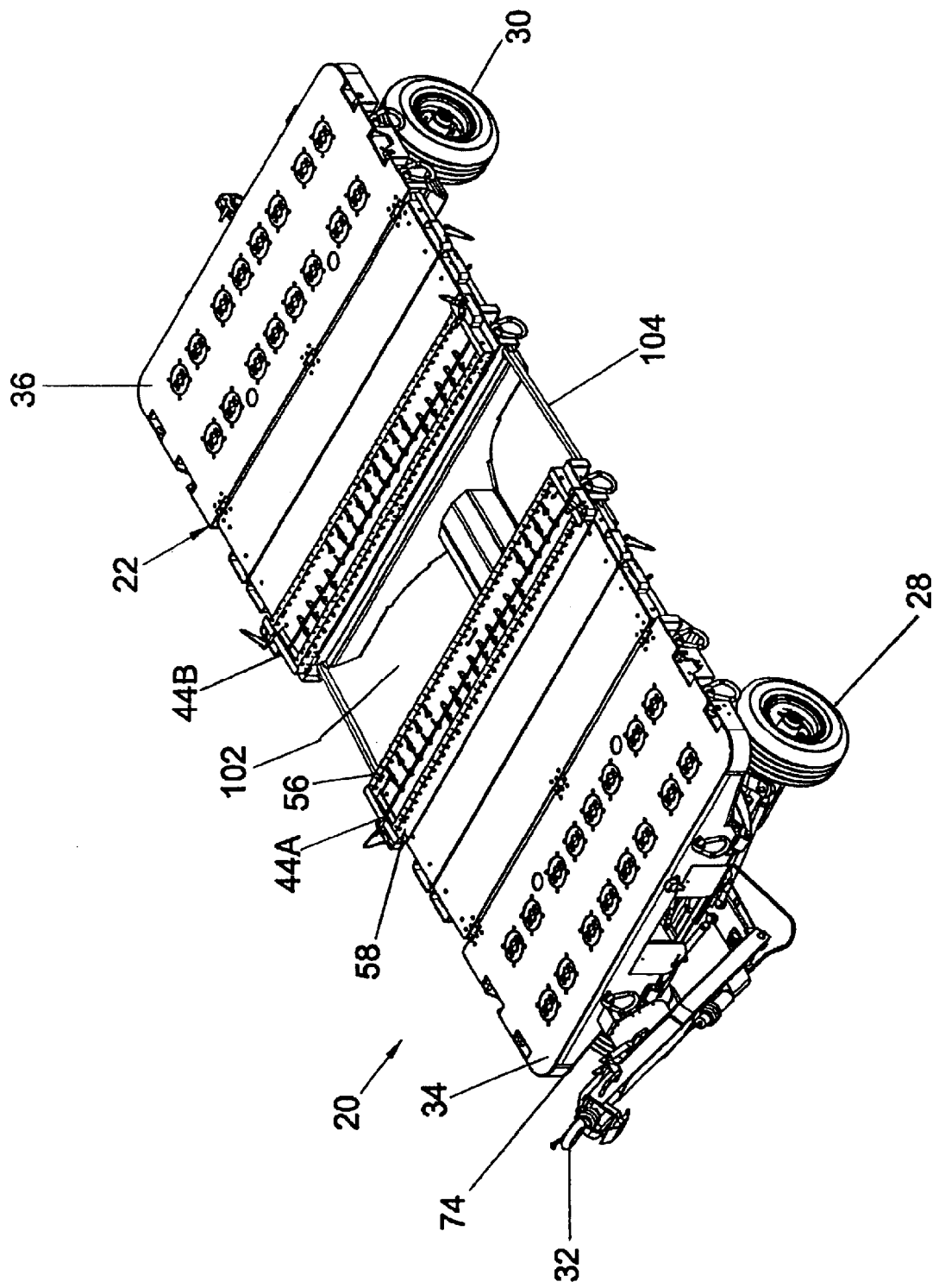
FIG. 4 is a perspective view of the munitions trailer of FIG. 1 converted to a first open deck configuration and not carrying a load.

A first open deck configuration is shown in FIG. 4. The middle set of doors 44A, 44B have been opened and lie flat on adjacent deck surfaces. The first door 44A (shown in FIG. 3) lies on top of the forward middle-deck section 38. The second door 44B lies over the rear middle-deck section 40. The mounting rails 56, 58 on each door panel are exposed. A middle deck opening 102 is uncovered between the doors. A removable side member or support bar 104 is normally in place between the deck sections 38, 40 and helps support the doors in the closed deck configuration. Support bar 104 spans the middle deck opening 102 and can be moved out of the way for access purposes when loading munitions.

Figure 5:
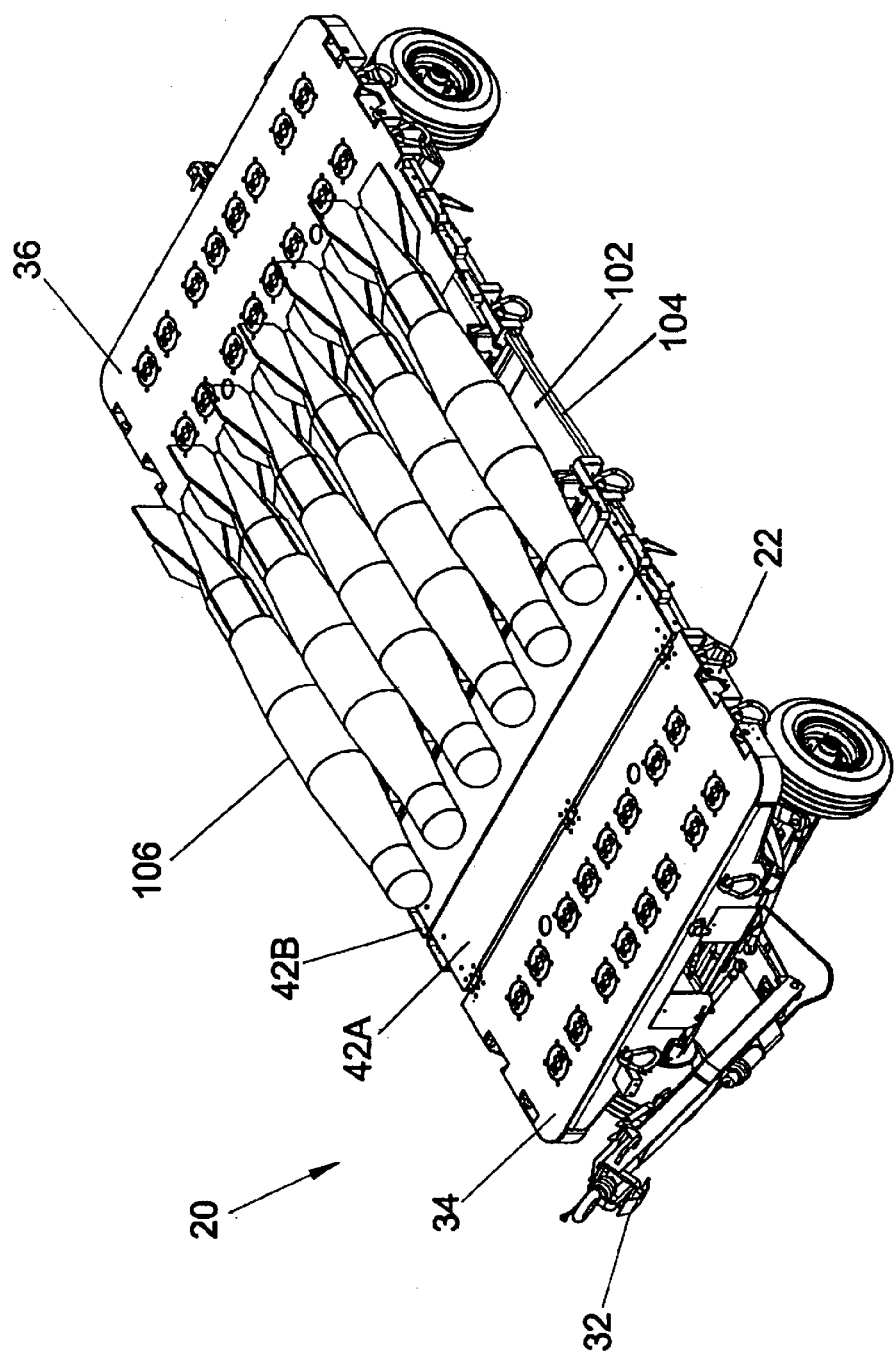
FIG. 5 is a perspective view of the munitions trailer configured as shown in FIG. 4 carrying a load of long bodied munitions.

FIG. 5 shows a munitions load carried on the munitions trailer 20 in the open deck configuration of FIG. 4. Chocks 62 have been assembled to the rails of the door panels 44A, 44B. Chocks 62 are aligned on the doors and provide cradles 68 (see FIG. 10) to hold opposite ends of munitions. A plurality of long bodied munitions or bombs 106 are loaded on the deck 22 with end sections resting in the cradles 68. The center of gravity of each munition item is located over the deck opening 102. During loading procedures the support bar 104 is moved out of the way. A loader can approach the deck 22 from the side. The loader has the usual hydraulic lifting platform to raise and lower a load. The loader is able to approach the deck 22 with the munitions load raised above the level of the deck. The loader locates the load poised over a pair of opposed chocks 62 and lowers the load onto the chocks. In doing so, the lifting platform of the loader descends through the deck opening 102 to a position beneath deck 22. Clearance provided by deck opening 102 permits this unencumbered procedure. In off-loading the munitions item, the reverse procedure is employed.

Figure 6:
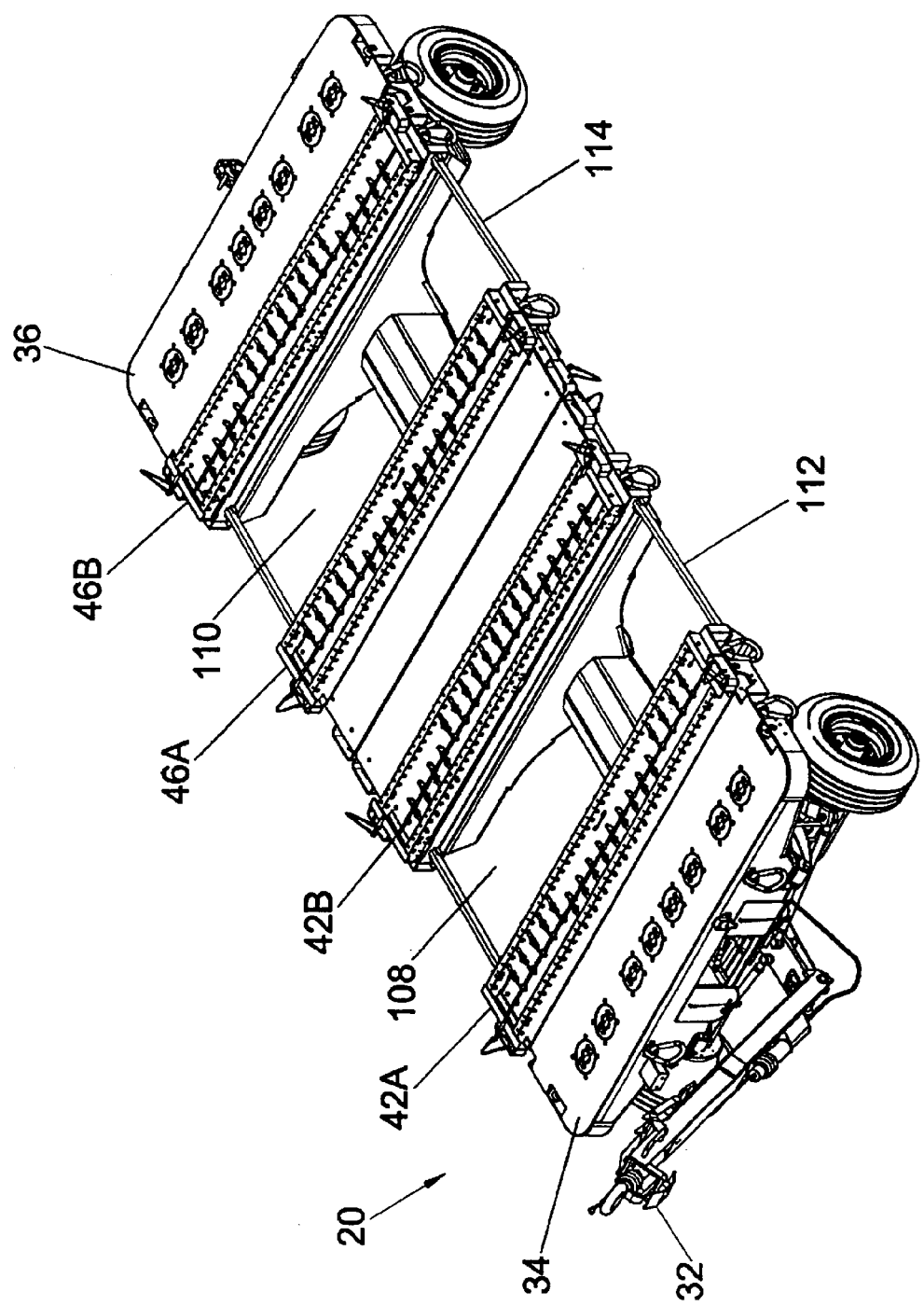
FIG. 6 is a perspective view of the munitions trailer of FIG. 1 converted to a second open deck configuration and not carrying a load.

FIG. 6 shows the munitions trailer 20 converted to a second open deck configuration. In this configuration the fore set of doors 42 are open as well as the aft set of doors 46. The first door panel 42A rests upon the forward deck 34. The second door panel 42B of the forward set rests upon the forward middle-deck section 38. The first door panel 46A of the aft door set rests upon the rear mid-deck section 40. The second door panel 46B of the aft door set rests upon the rear deck 36.

A forward deck opening 108 is uncovered between the first and second doors 42A, 42B of the first door set. An aft deck opening 110 is uncovered between the first and second door panels 46A, 46B of the aft door set. A moveable support bar 112 spans the forward deck opening 108 during transport and is moveable away for purposes of loading and unloading. In like manner a moveable support bar 114 spans the aft deck opening 110 during transport, but is moveable away during loading and unloading procedures. Mounting rails 56, 58 (FIG. 10) are exposed on the various door panels and are available for purposes of attaching various mounting structures for munitions.

Figure 7:
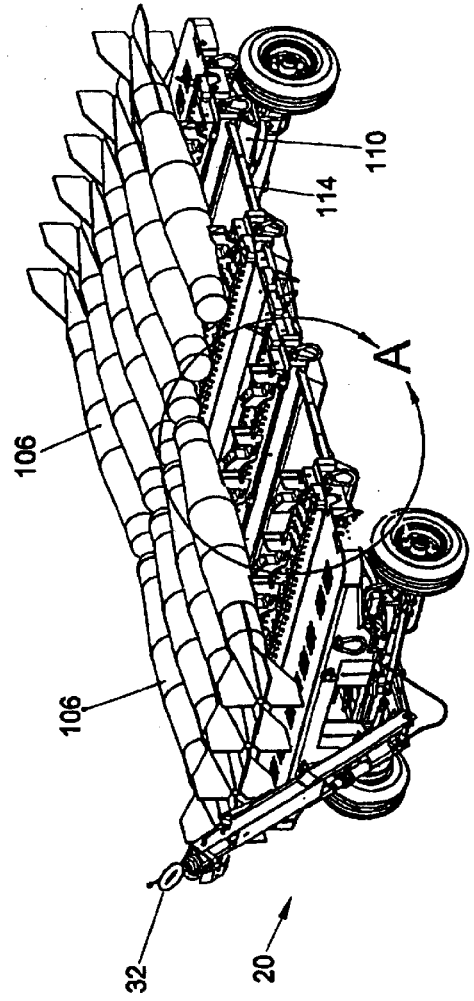
FIG. 7 is a view in perspective of the munitions trailer in the open deck configuration of FIG. 6 carrying a load of long bodied munitions.
Figure 7B:
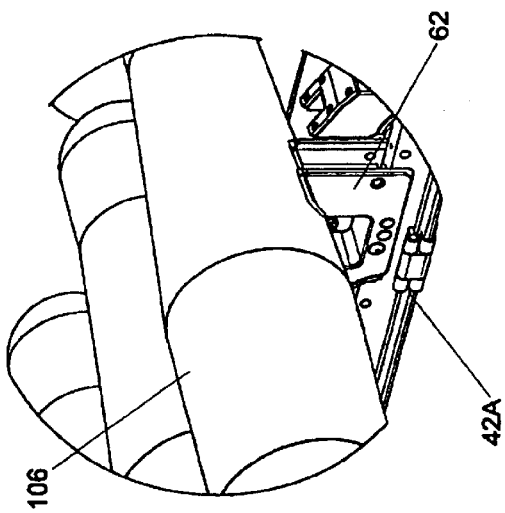
FIG. 7B is a further enlarged detail view of a portion of the munitions trailer shown in FIG. 7A.
Figure 7A:
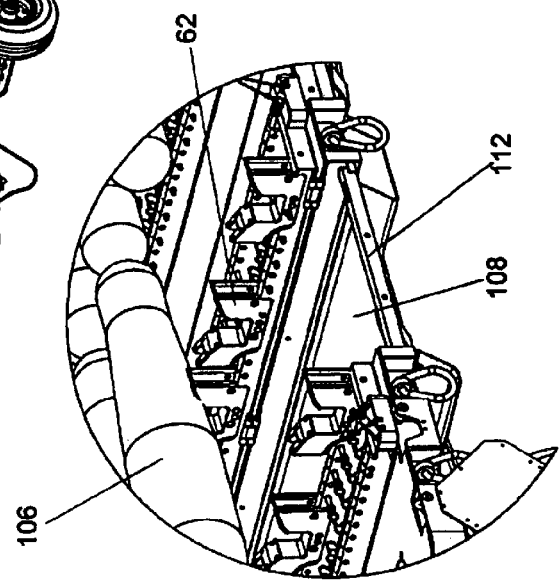
FIG. 7A is an enlarged detail view of a portion of the munitions trailer of FIG. 7 taken at the detail circle indicated at A.

FIG. 7 shows mounting chocks 62 mounted on the various door panels. The chocks are mounted in opposed pairs on the first and second door panels of each set. Long bodied munitions items shown as bombs 106 are loaded onto pairs of corresponding chocks. As shown in this particular open deck configuration, two ranks of bombs are loaded on munitions trailer 20. A first rank is loaded upon the chocks that are attached to the first and second panels 42A, 423 of the fore set of doors. A second rank of bombs is loaded onto the chocks that are attached to the first and second door panels of the aft set of doors. In each case the loading and unloading procedures are accomplished as previously described. Support bars 112, 114 are swung out of the way as shown in FIG. 7A This permits access for the lifting platform of loading equipment to load and unload the munitions items. FIG. 7B illustrates more particularly how a segment of a munitions item is held in the cradle provided by a chock 62.

Figure 8:
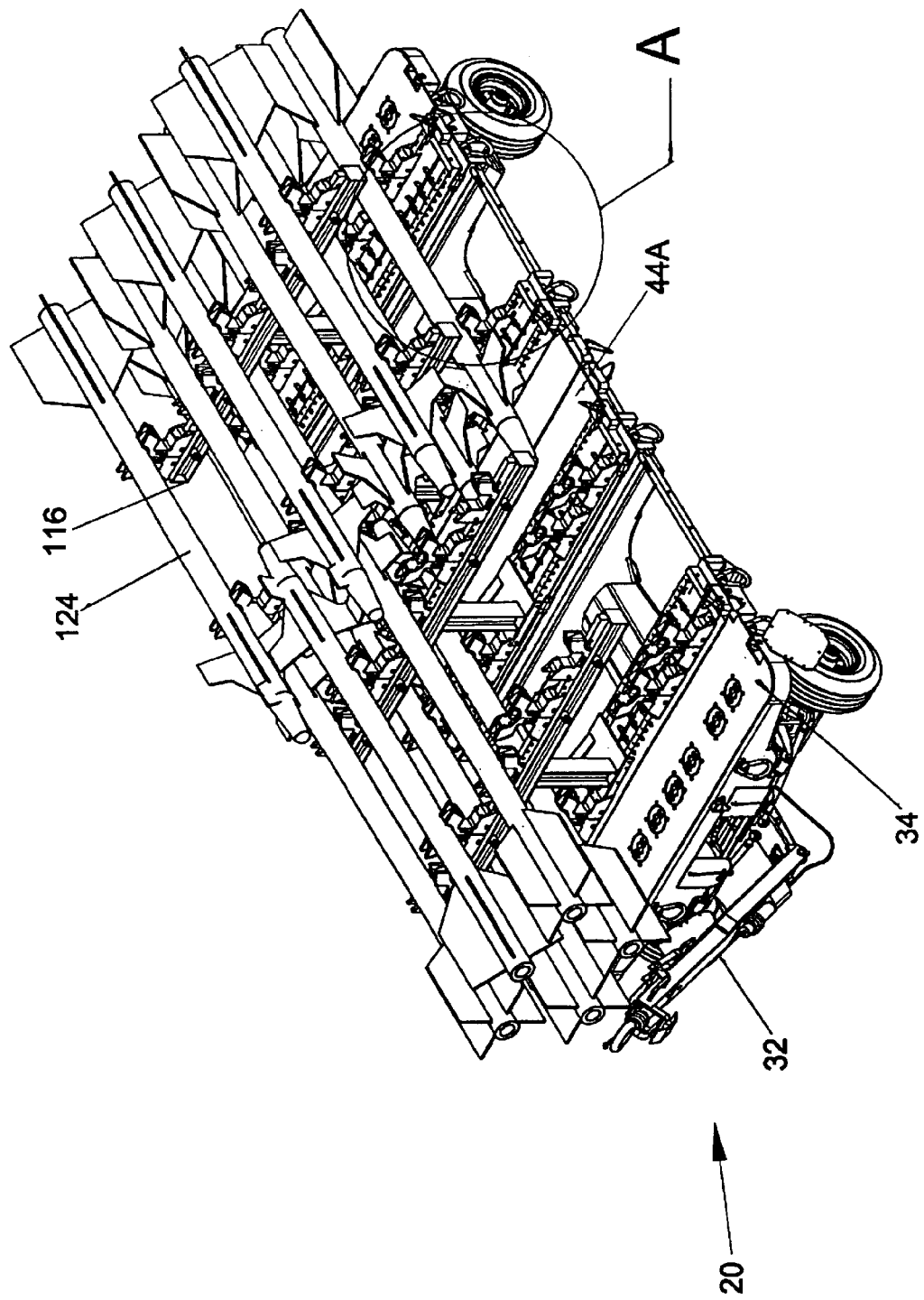
FIG. 8 is a view in perspective of the munitions trailer in the open deck configuration of FIG. 6 but equipped to carry a load of another variety of long bodied munitions.
Figure 8A:
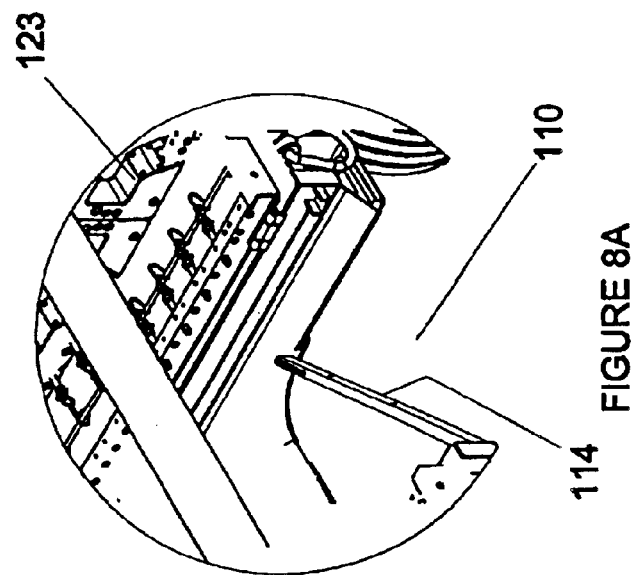
FIG. 8A is an enlarged detail view of a portion of the munitions trailer of FIG. 8 taken at the detail circle indicated at A.
Figure 8B:
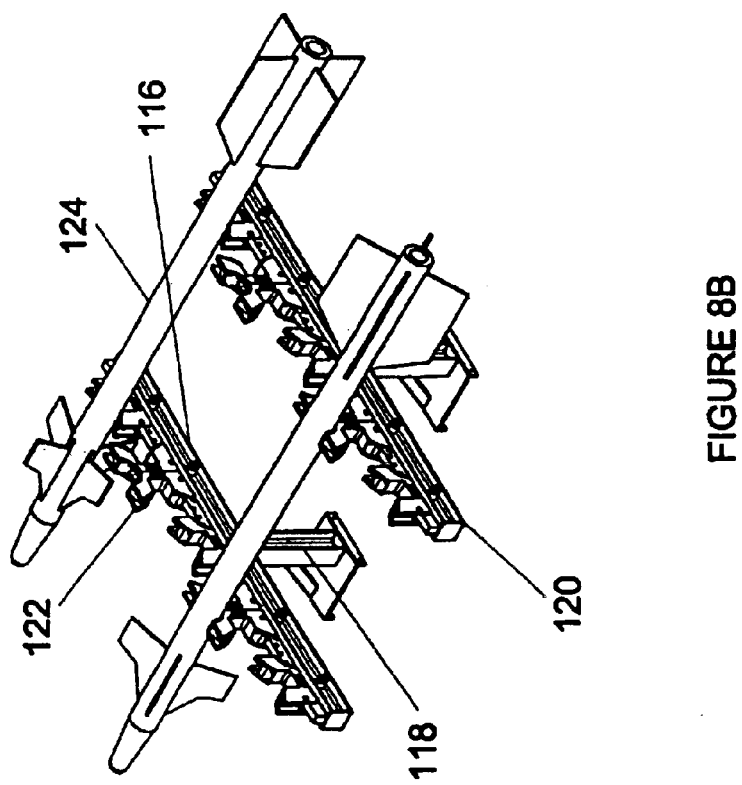
FIG. 8B is a view of munitions racks attached to the trailer in the configuration of FIG. 8 and shown carrying a pair of long bodied munitions items.

A further use of the munitions trailer 20 in the open configuration of FIG. 6 is shown in FIGS. 8, 8A and 8B. In this configuration, a plurality of missile racks are attached to the open door panels. A missile rack 116 is attached to each open door panel. The missile racks cooperate in pairs to hold elongate missiles. Each missile rack 116 has a vertical column 118 fixed by a base plate to the mounting rails on the door panel. The top end of the column 118 carries a lateral cross member 120. Cross member 120 carries a plurality of chocks 122. The chocks cooperate in pairs, each chock cooperating with another chock on the next mounting rack to hold the body of the missile.

A first pair of missile racks 116 are attached to the forward set of doors 42A, 42B for carrying a first rank of missiles 124. A like pair of missile racks are attached to the aft doors 46A, 46B to carry a second rank of missiles as shown in FIG. 8. The missiles are loaded and unloaded using the deck openings 108, 110 with the respective side support bars 112, 114 moved away. The missiles are loaded and unloaded using an appropriate loader (not shown). In some instances the missiles may be of a size that permits manual loading and unloading. At the same time the missile racks 116 are in use other chocks 123 (FIG. 8A) may be fastened directly to the rails 56, 58 on the door panels for holding a further supply of missiles beneath those carried on the missile racks.

It may be seen that through a combination of chocks and racks, a variety of munitions may be carried in this particular open configuration of the munitions trailer 20.

While certain embodiments of the invention have been shown and described it will be apparent to those skilled in the art that there can be other embodiments without departing from the scope and spirit of the appended claims.

What is claimed is:

1. A munitions trailer comprising:
   a main deck;
   a wheeled frame including a central beam connected to the main deck;
   said main deck having a forward deck a middle deck and an aft deck;
   said forward deck and middle deck separated by a forward deck opening providing clearance between the forward deck and the middle deck for loading and unloading munitions items;
   said middle deck and aft deck separated by an aft deck opening providing clearance between the middle deck and the aft deck for loading and unloading munitions items;
   a forward door set for closing the forward deck opening and movable between a closed position closing the forward deck opening and an open position uncovering the forward deck opening;
   an aft door set for closing the aft clock opening and movable between a closed position closing the aft deck opening and an open position uncovering the aft deck opening.

2. The munitions trailer of claim 1 wherein:

said forward door set is flush with the main deck when in the closed position and including mounting structure attached to the forward door set and exposed for use when the forward door set is in the open position for securing munitions supporting structure;

said aft door set being flush with the deck when in the closed position, and including mounting structure attached to the aft door set and exposed for use when the aft door set is in the open position for securing munitions supporting structure.

3. The munitions trailer of claim 1 wherein:

said middle deck includes a forward middle deck section and a rear middle deck section spaced from the forward middle deck section by a middle deck opening providing clearance between the forward middle deck section and the rear middle deck section for loading and unloading long bodied munitions items;

a middle door set for closing the middle deck opening and movable between a closed position closing the middle deck opening and an open position uncovering the middle deck opening.

4. The munitions trailer of claim 3 wherein:

said forward door set is flush with the main deck when in the closed position and including mounting structure attached to forward door set and exposed for use when the forward door set is in the open position for securing munitions supporting structure;

said aft door set is flush with the deck when in the closed position, and including mounting structure attached to the aft door setand exposed for use when the aft door set is in the open position for securing munitions supporting structure;

said middle door set is flush with the deck when in the closed position, and including mounting structure attached to middle door set and exposed for use when the middle door set is in the open position for securing munitions supporting structure.

5. The monitions trailer of claim 4 wherein:

said mounting structure attached to the forward door set includes a pair of parallel lateral mounting rails attached to the forward door set;

said mounting structure attached to the aft door set including a pair of parallel lateral mounting rails attached to the aft door set;

said mounting structure attached to the middle door set including a pair of parallel lateral mounting rails attached to the middle door set.

6. The munitions trailer of claim 5 wherein:

a front set of wheels and a rear set of wheels attached to the frame;

said frame including a tow bar and Ackerman steering geometry structure connecting the front and rear set of wheels to the tow bar.

7. The munitions trailer of claim 5 including:

tie down mechanisms attached to the deck.

8. The munitions trailer of claim 5 including:

a plurality of bulkheads connected to the central beam and connected to the forward, middle and aft decks to support the decks.

9. The munitions trailer of claim 5 including:

a plurality of long bodied munitions chocks releasably attachable to the mounting rails on the door sets in the open position.

10. The munitions trailer of claim 9 including:

at least one missile rack releasably attachable to the mounting rails on the door sets in the open position.

11. A munitions trailer comprising:

a main deck;

a wheeled frame including a central beam connected to the main deck;

said main deck having a forward deck, a middle deck and an aft deck;

said forward deck and middle deck separated by a forward deck opening;

said middle deck and aft deck separated by an aft deck opening;

a forward door set for closing the forward deck opening and movable between a closed position closing the forward deck opening and an open position uncovering the forward deck opening;

said forward door set being flush with the main deck when in the closed position and including mounting structure attached to the forward door set end exposed for use when the forward door set is in the open position for securing munitions supporting structure;

an aft door set for closing the aft deck opening and movable between a closed position closing the aft deck opening and an open position uncovering the aft deck opening;

said aft door set being flush with the deck when in the closed position, and including mounting structure attached to the aft door set and exposed for use when the aft door set is in the open position for securing munitions supporting structure;

said mounting structure attached to the forward door set including a pair of parallel lateral mounting rails attached to the forward door set;

said mounting structure attached to the aft door set including a pair of parallel lateral mounting rails attached to the aft door set.

12. A munitions trailer convertible between a closed deck configuration for general transport usage and a choice of open deck configurations for transport of long bodied munitions, comprising:

a trailer frame having a front set of wheels and a rear set of wheels;

a main deck mounted on the frame;

said main deck divided into deck portions including a forward deck, a middle deck and an aft deck;

said forward deck and middle deck spaced apart by a forward deck opening spanning the width of the main deck;

said middle deck and aft deck spaced apart by an aft deck opening spanning the width of the main deck;

said frame including a main beam connecting the forward, middle and aft decks;

a forward door assembly between the forward deck and the middle deck, movable between a closed position covering the forward deck opening, and an open position uncovering the forward deck opening permitting substantially unobstructed access through the forward deck opening purposes of loading and unloading said long bodied munitions, said forward door assembly including a first door hinged to the forward deck and a second door hinged to the middle deck with each door movable between a closed position in partially covering relationship to the forward deck opening, and an open position uncovering the forward deck opening and lying flat on the surface of the deck that it is hinged to;

an aft door assembly connected between the middle deck and the aft deck, movable between a closed position covering the aft deck opening, and an open position uncovering the aft deck opening permitting substantially unobstructed access through the aft deck opening for purposes of loading and unloading said long bodied munitions, said aft door assembly including a first door hinged to the middle deck and a second door hinged to the aft deck with each door movable between a closed position in partially covering relationship to the aft deck opening, and an open position uncovering the aft deck opening and lying flat on the surface of the deck that it is hinged to;

each door having at least one mounting rail that is accessible when the door is in the open position for the purpose of mounting a cradle structure for holding a segment of a long bodied munitions item.

13. The munitions trailer of claim 12 wherein:

each door has a pair of said lateral mounting rails.

14. The munitions trailer of claim 12 wherein:

said middle deck is divided into a forward middle-deck section and an aft-middle deck section, said forward middle-deck and aft middle-deck sections being spaced apart by a middle deck opening;

a middle door assembly connected between the forward middle-deck section and the aft middle-deck section, movable between a closed position covering the middle deck opening, and an open position uncovering the middle deck opening permitting substantially unobstructed access through the middle deck opening for purposes of loading and unloading long bodied munitions.

15. The munitions trailer of claim 14 wherein:

the doors are flush with the deck when in the closed position.

16. The munitions trailer of claim 14 wherein:

said forward door assembly doors are flush with the main deck when in the closed position and including mounting structure attached to the forward doors and exposed for use when the forward door, are in the open position for securing munitions supporting structure;

said aft door assembly doors are flush with the main deck when in the closed position, and including mounting structure attached to the aft doors and exposed for use when the aft doors are in the open position for securing munitions supporting structure;

said middle door assembly doors are flush with the main deck when in the closed position, and including mounting structure attached to the middle doors and exposed for use when the middle doors are in the open position for securing munitions supporting structure.

17. The munitions trailer of claim 16 including:

a plurality of bulkheads connected to the main beam and connected to the forward, middle and aft decks to support the decks.

18. The munitions trailer of claim 17 including:

tie down mechanisms attached to the deck.

19. A munitions trailer comprising:

a first flat deck;

a second flat deck longitudinally spaced from the first deck by a first deck opening that provides clearance between the first flat deck and the second flat deck for the loading and unloading of munitions items;

a third flat deck longitudinally spaced from the second dock by a second deck opening that provides clearance between the second flat deck and the third flat deck for the loading and unloading of munitions items;

a trailer frame including a main beam having segments centrally connecting the first deck to the second deck and the second deck to the third deck;

a first door set having first and second doors connected between the first and second decks, one door pivotally connected to a trailing edge of the first deck, the other door pivotally connected to a leading edge of the second deck such that the doors are movable between a closed position covering the first deck opening, and an open position uncovering the first deck opening;

a second door set having first and second doors connected between the second and third decks, one door pivotally connected to a trailing edge of the second deck, the other door being pivotally connected to a leading edge of the third dock such that the doors are movable between a closed position in covering relationship to the second deck opening, and an open position uncovering the second deck opening.

20. The munitions trailer of claim 19 including:

a fourth flat deck spaced from the third deck by a third deck opening;

a main beam segment connecting the fourth deck to the third deck;

a third door set having first and second doors connected between the third and fourth decks, one door pivotally connected to a trailing edge of the third deck, the other door being pivotally connected to a leading edge of the fourth deck such that the doors are movable between a closed position in covering relationship to the third deck opening, and an open position uncovering the second deck opening;

said door sets being flush with the decks when in the closed position.

21. The munitions trailer of claim 20 including:

a plurality of bulkheads connected to the main beam and connected to the first, second and third decks to support the decks.

22. The munitions trailer of claim 21 including:

mounting structure attached to the doors on a side of the door that faces up when the door is in the open position for securing structure to hold long bodied munitions items.

* * * * *

UNITED STATES PATENT AND TRADEMARK OFFICE
CERTIFICATE OF CORRECTION

PATENT NO. : 6,935,818 B2
DATED : August 30, 2005
INVENTOR(S) : Hoeper, John H. et al.

It is certified that error appears in the above-identified patent and that said Letters Patent is hereby corrected as shown below:

Column 4,
Line 46, "aims" should be -- arms --.

Column 6,
Line 49, a comma is missing after "forward deck".
Line 64, "clock" should be -- deck --.

Column 7,
Line 32, "setand" should be -- set and --.
Line 40, "monitions" should be -- munitions --.

Column 8,
Line 21, "end" should be -- and --.

Signed and Sealed this

Eighth Day of November, 2005

JON W. DUDAS
*Director of the United States Patent and Trademark Office*